United States Patent

[11] 3,538,859

[72] Inventors Rudolph Alt,
Methuen and
Pasquale Giuffrida, Salisbury,
Massachusetts
[21] Appl. No. 684,410
[22] Filed Nov. 20, 1967
[45] Patented Nov. 10, 1970
[73] Assignee Advance Bakery Corporation
Lawrence, Massachusetts
a corporation of Massachusetts

[54] HOLLOW BAKERY SHELLS
4 Claims, 9 Drawing Figs.
[52] U.S. Cl. ............................................... 107/4,
18/13, 107/1, 107/8, 107/19, 107/54
[51] Int. Cl. ..................................................... A21c 3/10,
A21c 11/10

[50] Field of Search.................................. 107/1.1, 1,
8, 8.5, 4.2, 8.8, 14.7, 19.4, 54.2, 4; 18/13, 13(I), 13(F)

[56] References Cited
UNITED STATES PATENTS
368,591  8/1887  Jones et al. ................... 18/13X
862,475  8/1907  Haywood ..................... 18/13X
2,580,726  1/1952  Brewer .......................... 107/1

*Primary Examiner*—Edward L. Roberts
*Attorney*—Edward A. Gordon

ABSTRACT: A method and apparatus for producing hollow tubelike bakery shells wherein a uniform layer of dough is extruded from an extrusion die onto the surface of a center support which is passed through the die and thereafter the layer of dough is cut into a plurality of sections and cooked while held on the support.

Patented Nov. 10, 1970

INVENTORS,
Pasquale Giuffrida
Rudolph Alt
BY *Edward A. Gordon*
ATTORNEY

HOLLOW BAKERY SHELLS

The present invention relates to a method of forming a batch of plastic, deformable, pliant composition such as dough into a tubelike shape and is particularly concerned with, though not limited to, the quantity production of tubelike bakery shells and to apparatus that automatically forms, bakes and discharges bakery shells having the shape of an annulus or a generally tubelike shape.

In the production of bakery shells having a generally tubelike shape it is desirable that the shells be seamless and be uniform in thickness.

Heretofore, in almost every instance in the formation of cylindrical tubelike bakery shells, a cylinder of dough is formed and worked by hand in an effort to meet these requirements. Generally the dough is rolled into strips and turned with the fingers of the baker to form a cylinder with the dough ends overlapping. The overlapped ends are then hand worked into integral relation forming the cylinder. This method of forming the dough into a tubular shape is not only slow and inefficient, but also the cylinder or tube thus formed has a nonuniform thickness and there is generally a seam visible where the ends are joined.

Heretofore there was no method or apparatus for satisfactorily and efficiently forming dough into tubular bakery shells.

Accordingly, a principal object of the present invention is to provide an improved method of forming a batch of plastic, deformable, pliant composition such as dough into shells of the shape described above which avoids the foregoing disadvantages.

Another object of the invention is to provide apparatus for carrying out the method set forth above which is economical to operate, safe, easy to maintain, clean and sanitary, and easy to install.

A still further object of the present invention is to provide a fully automatic apparatus to extrude, form, dough rest and deep fry tubular bakery shells.

Other objects of the invention will in part be obvious and will in part appear hereinafter.

The invention accordingly comprises the apparatus possessing the construction, combination of elements and arrangement of parts, and the process involving the several steps and the relation and order of one or more of such steps with respect to each of the others which are exemplified in the following detailed disclosure and the scope of the application of which will be indicated in the claims.

For a fuller understanding of the nature and objects of the invention, reference should be had to the following detailed description taken in connection with the accompanying drawings wherein.

Figure 1:
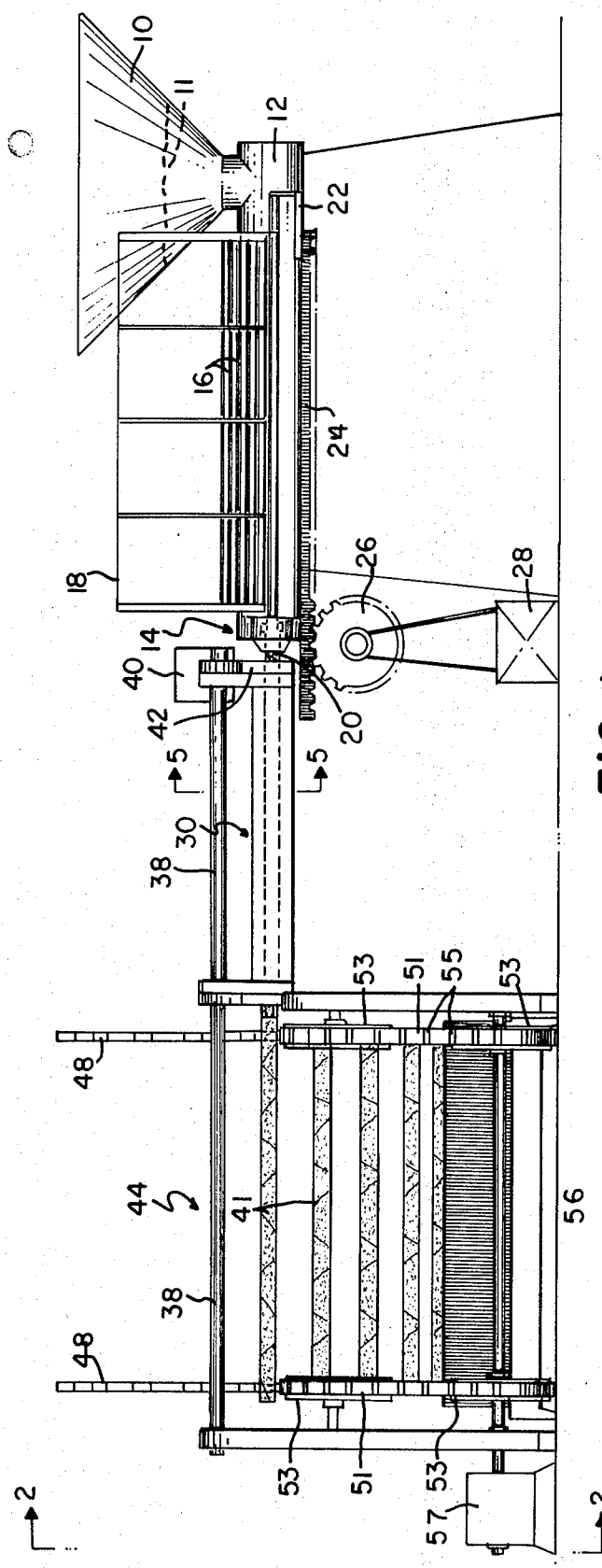
FIG. 1 is a side elevational view of an apparatus embodying the present invention.
Figure 2:
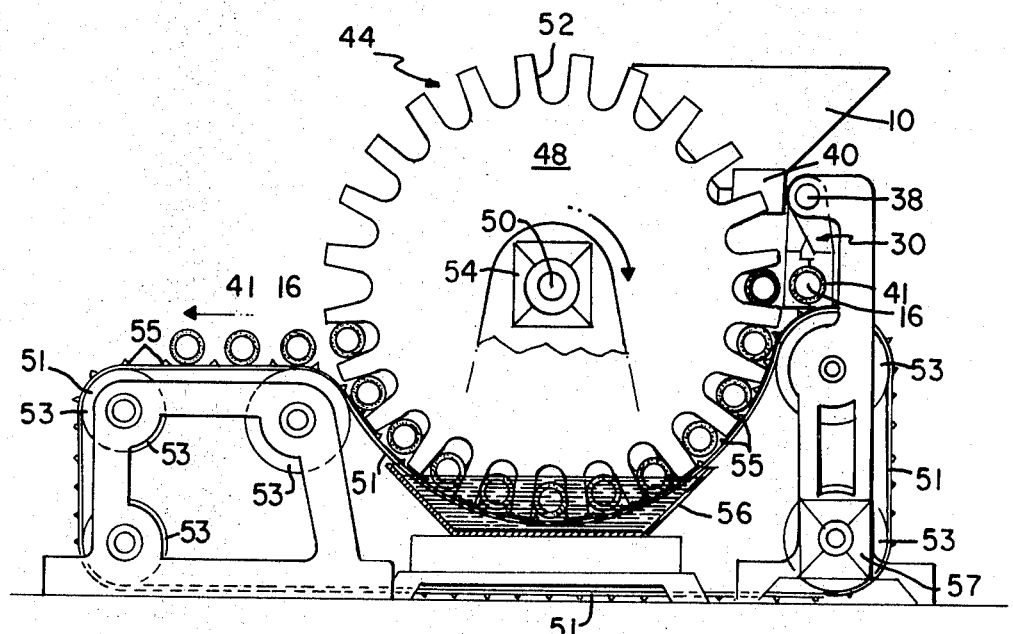
FIG. 2 is a view taken along the line 2—2 of FIG. 1.
Figure 3:
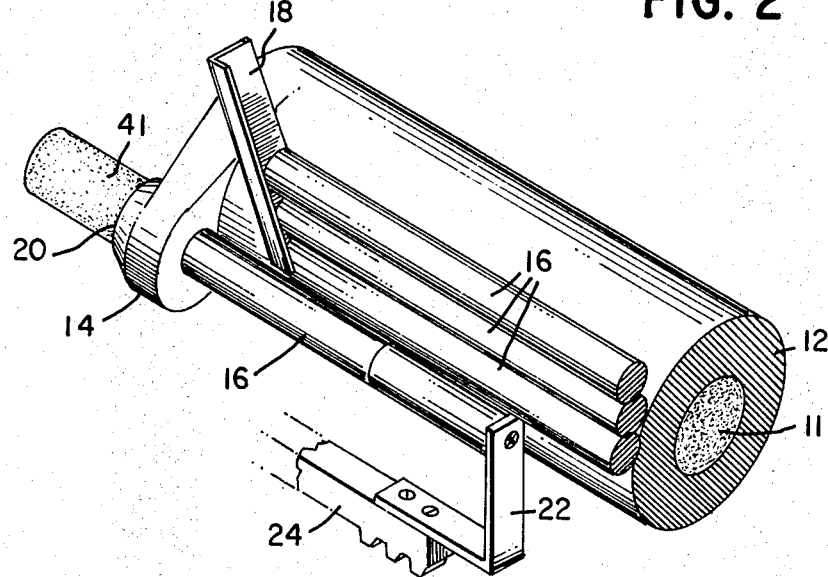
FIG. 3 is a perspective view in a larger scale illustrating the extrusion die.
Figure 4:
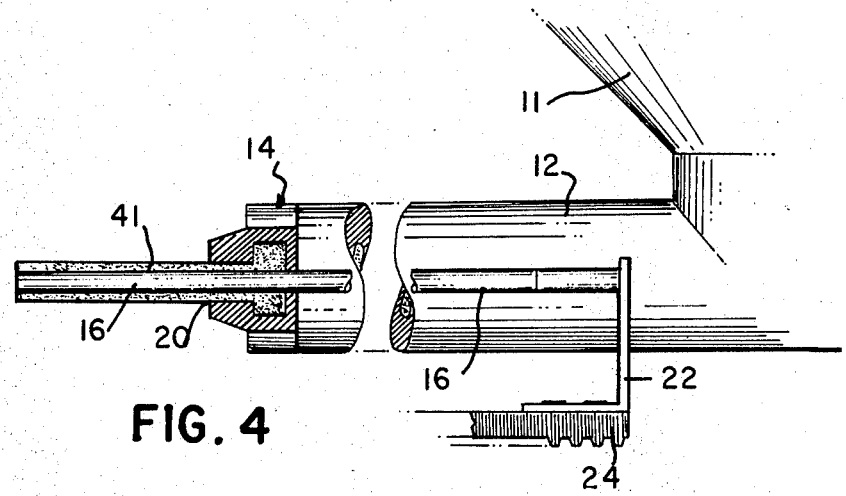
FIG. 4 is a fragmentary view partly in longitudinal section of the extrusion die.

In its broadest aspect the method of the present invention comprises passing a center support through an extrusion zone extruding a plastic deformable, pliant composition such as dough onto the surface of said center support, and moving the center support relative to the extruded composition to provide a coating of dough on the surface of said support, passing said center support to a cutting zone, thereafter cutting the layer of dough to provide a plurality of sections of dough and thereafter passing said support to a cooking zone and then cooking said dough while held by said support and removing said sections.

In the preferred embodiment of the present invention as broadly stated, the apparatus for producing the tubelike bakery shells comprises means for receiving dough to be formed into bakery shells, means associated with said receiving means for extruding said dough, means for passing a center support into contact with said extruded dough to provide a layer of dough on the surface of said support, means for cutting said layer of dough into a plurality of sections and other means for cooking said sections while held on said support to provide a plurality of hollow bakery shells.

Referring now to the drawings, wherein like characters refer to like elements, there is illustrated a preferred embodiment of the apparatus of the invention wherein there is provided a suitable means 10 for receiving prepared dough 11 to be fabricated into bakery shells. Receiving means 10 is connected by delivery means 12 to an extrusion die 14. In the preferred embodiment of the invention the delivery means 12 is a screw mechanism which can be driven by suitable means (not shown) well known to those skilled in the art.

Adjacent to the extrusion die 14 are a plurality of dough supports 16. Preferably the dough supports 16 are elongated cylindrical rods having a plastic surface of Teflon. The dough supports 16 are held by means 18 which is preferably an open rack inclined at an angle to the vertical axis of the extrusion die. The rack 18 is constructed and arranged so that the axis of the dough support rod 16 is positioned immediately adjacent the extrusion die 14 and is in alignment with the axis of the opening 20 of the extrusion die 14. There is provided means for moving the dough support rod 16 and the extrusion die relative to each other so that each dough support rod passes through the extrusion die; an exemplary means as shown may be a rod pusher 22 connected to suitable means for moving the rod forward through the extrusion die and then returning the rod pusher to its initial position to receive the next support rod. Suitable means for operating the rod pusher may comprise, as shown, a gear rack 24 having one end affixed to the rod pusher and the other end connected to a reciprocating wheel 26 driven by a suitable motor 28 as schematically shown.

In the preferred embodiment of the invention means are provided adjacent the extrusion die for receiving the dough-coated supports 16, cutting the layers of dough on the support into a plurality of sections and moving the dough support, after the cutting operation, to a point remote from the extrusion die.

Figure 5:
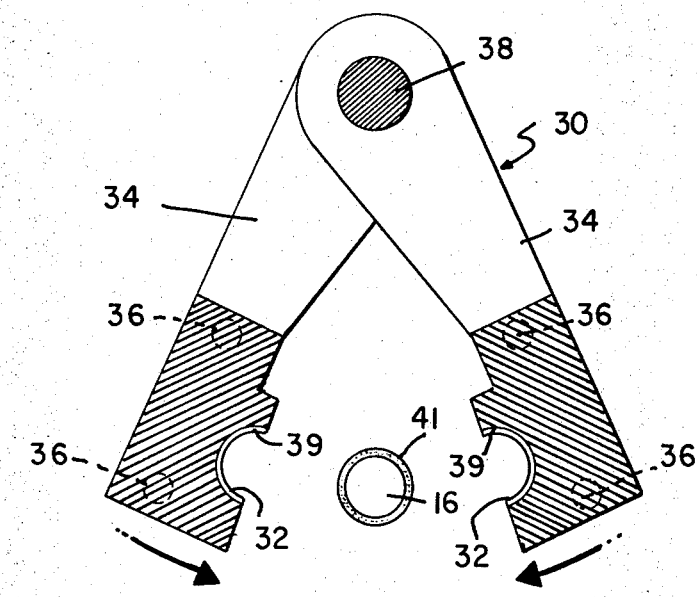
FIG. 5 is a cross-sectional view taken on line 5—5 of FIG. 1 showing the partially open gripping means for holding and cutting the dough on the dough support to form a plurality of shells.
Figure 6:
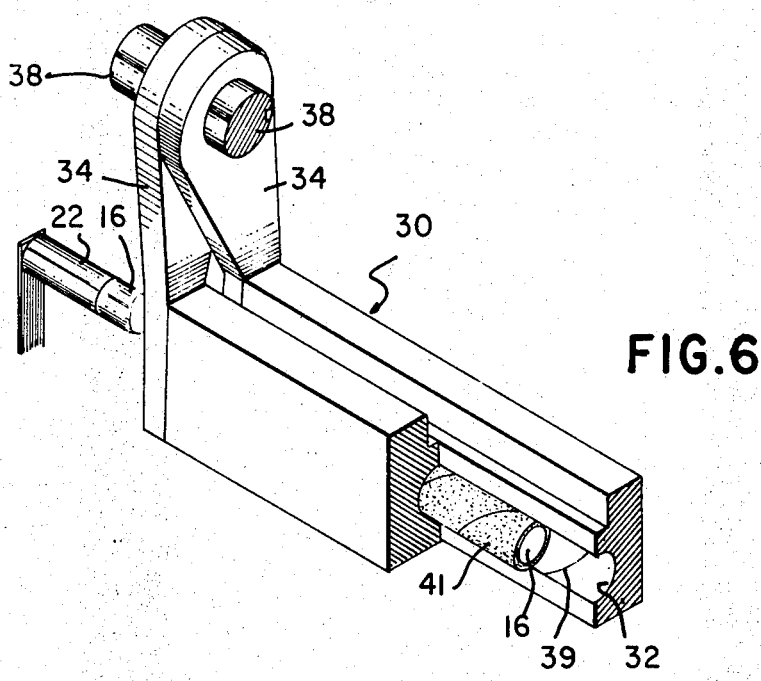
FIG. 6 is a fragmentary side elevational view of the gripping and cutting means in closed position.
Figure 7:
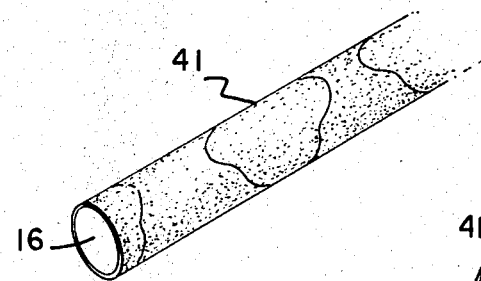
FIG. 7 is a perspective view showing the dough cut into individual shells on the dough support.

The receiving means comprise a pair of elongated gripping means 30. The internal surface of each gripping means is provided with a curved surface, as at 32 FIG. 5. The gripping means are mounted on arms 34 by suitable bolt means 36. The arms 34 are mounted on rod 38 so as to be pivotally and slidably movable relative to each other and to rod 38. The inner surface of each gripping means is provided with cutting edges 39. The cutting edges are arranged along the internal surface of the gripping means 30 so that when the gripping means are moved to closed position about the dough support 16, as shown in FIG. 6, the edges cooperate to cut the layer of dough 41 into the desired lengths and shapes. The gripping means 30 may be moved by any suitable motor shown schematically at 40 and which is preferably carried on a vertical support member 42 which is preferably slidably connected to rod 38. The motor may be suitably connected and geared to the arms 34 by means (not shown) well known to those skilled in the art. Means may be provided for moving the gripping means 30 and motor 40 along the rod 38 to a point remote from the extrusion die and adjacent a conveyor means 44. Preferably the means consists of a suitable connecting means (not shown) similar to rod 24 having one end attached to the motor support 42 and the other end attached to shaft 24. In this manner as shaft 24 and rod pusher 22 push a support rod through the extrusion die 14, the preceeding support rod previously coated with dough and held by gripping means 30 is moved to a position adjacent the conveyor means 44.

The conveyor means 44 is preferably a pair of wheels 48 connected by a suitable axle means 50. The wheels 48 are provided with groove means 52 for receiving and holding the ends of the dough support rods 16. Preferably an endless belt 51 is arranged to roll over spools 53 and adjacent to wheels 48 through a portion of their rotation to retain the dough support rods 16 in the grooves until the dough is cooked. The belts are preferably provided with vanes 55 which assist in retaining the support rods in the grooves and in conveying the dough support rods as hereinafter described. The wheels 48 are arranged to be rotated by a suitable motor means 54. Preferably the belts 51 are arranged to be driven by a motor 57 driven synchronically with motor 54. In this manner the belts and wheels may be easily rotated at the same speed. Rotation of the conveyor wheels 48 carries the dough support rods 16 to means for cooking the layer of dough on the support rods 16. Preferably the means for cooking the layer of dough is a deep fryer 56 positioned adjacent to the bottom of the conveyor wheels 48. The deep fryer 56 is preferably positioned adjacent to the conveyor wheels 48 so that continued rotation of the conveyor wheels passes the dough support rods 16 carrying the layer of dough 41 through the cooking medium, such as a solution of hot fat. The rate of travel of the conveyor wheels 48 is arranged so that the time of passage from the point of reception of the dough support rods 16 to the deep fry is sufficient to provide a dough rest period. The rate of travel of the dough support 16 through the deep-frying solution also provides a sufficient residence time in the solution to cook the layer of dough on the support rod 16. Upon leaving the deep fryer 56 the dough support rod carrying the plurality of cooked bakery shells is carried on belts 51 which serve as a conveyor to remove the dough support rods 16 to a point remote from the deep fryer 56. The dough support rods carrying the cooked bakery shells are then removed from the dough support rod. The dough support rod 16 is then returned to rack 18 for reuse.

In operation of the apparatus, the prepared dough 11 is introduced into the dough-receiving means 10. The dough is then fed to the extrusion die 14 by delivery means 12. As the dough is extruded from extrusion die 14 a dough support rod 16 is passed through the extrusion die by rod pusher 22 and is coated with a uniform layer of dough 41. After the dough support rod 16 has been passed through the extrusion die and has received a uniform layer of dough, it is then in position between gripping and cutting means 30 which are in the open position as shown in FIG. 5. The gripping and cutting means 30 are then moved to closed position about the coated dough support by motor means 40. As the dough support is uniformly grasped by the gripping means 30 the layer of dough 41 is cut by edges 39 into the desired lengths and shapes. While in the closed position the gripping means 30 are moved along rod 38 to a point adjacent the conveyor means 44. The gripping means 30 are then moved to open position and the dough support 16 is deposited on the conveyor means 44. The dough support is then carried to and passed through the deep fryer.

The rate of travel of the dough support from the time it is deposited on the conveyor to the deep fryer is sufficient to permit the dough to have a suitable rest time prior to entering the fryer and a sufficient residence time in the fryer to cook. After leaving the deep fryer, the dough support is unloaded onto the layoff conveyor. The dough support rods are then removed and returned to the rack 18 for reuse. At this point the baked shells may be slightly connected at the cut edge and can be easily broken manually into the individual shells.

Accordingly there is provided a method and apparatus for forming dough into tubelike bakery shells wherein a uniform layer of dough is extruded onto the surface of a center support, thereafter cutting the layer of dough while held on the center support into a plurality of sections and then cooking the section of dough while held on said support to form a seamless bake shell of uniform thickness.

Figure 8:
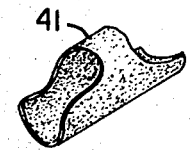
FIG. 8 is a perspective view of one type of bake shell produced according to the present invention.
Figure 9:
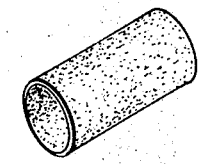
FIG. 9 is a perspective view of another type of bake shell produced according to the present invention.

Examples of bakery shells produced in accordance with the present invention are shown in FIGS. 8 and 9. FIG. 8 shows a bakery shell of the canoli type while FIG. 9 shows a yule log shell. The bakery shells are suitable for filling with various fillings such as creams or cheeses. The shells may be filled by the maker or retailer or packaged and sold to a consumer for filling.

Obviously, many modifications and variations of the present invention are possible in the light of the above teachings. For example, the dough support can be of various lengths and sizes. Additionally the shape or configuration of the dough support rod may be varied. For example the support rod may have a triangular square, oval or rectangular shape.

We claim:

1. A method of forming hollow seamless tubelike bakery shells comprising the steps of passing an elongated center support through a dough extrusion zone, extruding a layer of dough onto the surface of said support, passing said support to a cutting zone, cutting the layer of dough on said center support to provide at least one section of dough having a desired length and shape, passing said center support through a cooking zone, cooking said dough while held on said support and thereafter removing the resultant bakery shell from said support.

2. The method of claim 1 wherein the dough support is passed from said cutting zone to said cooking zone at a rate of travel to provide a sufficient rest time for said dough.

3. The method of claim 1 wherein the dough support is passed through said cooking zone at a rate of travel to provide sufficient residence time in the cooking zone to cook said dough.

4. An apparatus for making seamless hollow tubelike bakery shells comprising means for receiving dough to be formed into said bakery shells, a die for extruding dough associated with said receiving means, a plurality of elongated center supports, means for moving each elongated center support through said extrusion die whereby the surface of said center support is provided with a layer of dough, means adapted and arranged to grip the center support with the layer of dough thereon, means to cut said layer of dough into a plurality of sections, means for cooking said dough while held on said support, and means for moving said dough support from said extrusion means to said cooking means.